Figure 1:
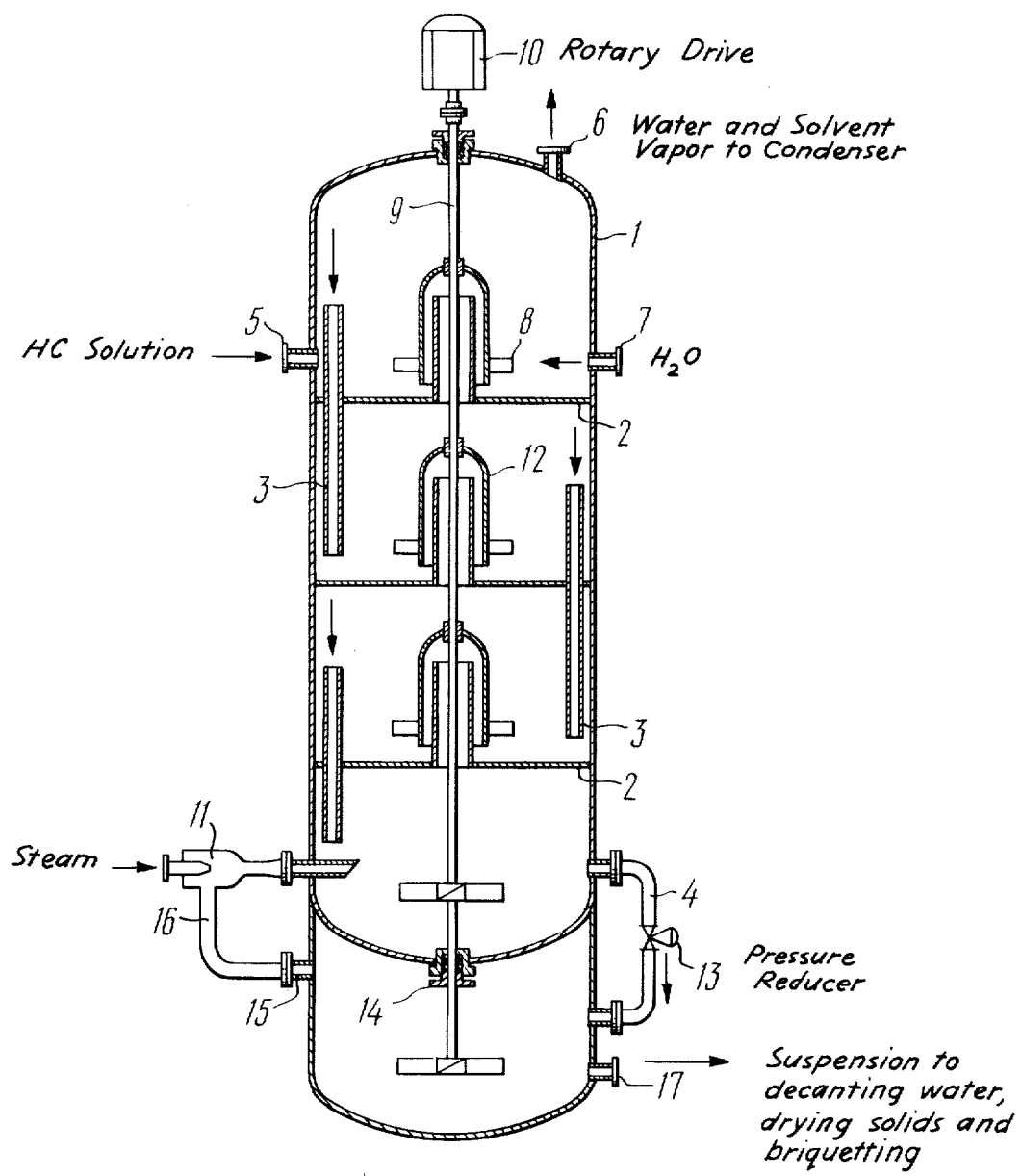

United States Patent [19]
Zinoviev et al.

[11] 3,933,574
[45] Jan. 20, 1976

[54] METHOD OF AND DEVICE FOR ISOLATION OF RUBBER-LIKE POLYMERS FROM HYDROCARBON SOLUTIONS

[76] Inventors: Alexandr Fedorovich Zinoviev, ulitsa Scherbakovskaya, 9, kv. 59; Boris Sergeevich Korotkevich, Fortunatovskaya ulitsa, 31/35, kv. 71; Sergei Timofeevich Petukhov, Fortunatovskaya ulitsa, 31/35, kv. 9; Izmail Mikhailovich Basiev, Zverinetskaya ulitsa, 14, kv. 58; Jury Alexandrovich Shmuk, Leninsky prospekt, 13, kv. 31; Ulchar Ashraf ogly Mamedov, ulitsa Radio, 20, kv. 26; Ilya Yakovlevich Poznyak, ulitsa Scherbakovskaya, 9, kv. 120; Naum Mikhailovich Starominsky, ulitsa Scherbakovskaya, 11, kv. 116; Nikolai Pavlovich Shmarovoz, ulitsa Lermontova, 34, kv. 58, all of Moscow; Vladimir Alexandrovich Volnakov, ulitsa Lenina, 27/40, kv. 38, Efremov; Viktor Georgievich Minaev, ulitsa Sverdlova 63, kv. 6, Efremov; Alexei Semenovich Strukov, ulitsa Lenina, 26, kv. 21, Efremov, all of U.S.S.R.

[22] Filed: Aug. 7, 1973

[21] Appl. No.: 386,383

[52] U.S. Cl. .................. 159/16 S; 159/18; 159/47
[51] Int. Cl.$^2$... B01D 1/14; B01D 1/26; B01D 1/00; C07D 211/00
[58] Field of Search.......... 159/DIG. 10, 16 S, 20 R, 159/18; 260/94.7 R, 94.7

[56] References Cited
UNITED STATES PATENTS

| | | | |
|---|---|---|---|
| 2,300,985 | 11/1942 | Smith | 159/20 R |
| 3,076,795 | 2/1963 | Hall | 260/94.7 R |
| 3,190,868 | 6/1965 | Mitacek et al. | 260/94.7 R |
| 3,357,900 | 12/1967 | Snell | 203/47 |
| 3,421,567 | 1/1969 | Hoppe | 159/16 S |
| 3,772,262 | 11/1973 | Clementi | 260/94.7 R |

*Primary Examiner*—Jack Sofer
*Attorney, Agent, or Firm*—Waters, Schwartz & Nissen

[57] ABSTRACT

A method of isolating rubber-like polymers from hydrocarbon solutions comprises at least three steps of steaming and a device for realization of this method in which the hydrocarbon solution is delivered into the upper section of the vertical column of the device, which is the first steaming step at which the temperature is maintained within the range from 80° to 180°C. At the first steaming step, the hydrocarbon solution is processed by steam which is delivered into the sections of the device through the steam intake. During this process the main bulk of the solvent is evaporated and the polymer is isolated in the form of granules. The solvent vapor, together with steam, are delivered to the condensation step. The isolated granules of the polymer are mixed with water to prepare an aqueous suspension by mechanical stirring means which are provided in each separate section of the column. The suspension is continually delivered along the means for the passage of the suspension into the lower sections of the column, which are the next steps of the steaming process. At these steps the suspension is also treated with steam, mixed, and the vapors are withdrawn. The temperature at all subsequent steps of the steaming process, (except the last step, which is accomplished in the lower section) is maintained in the range from 115° to 180°C. The lower section is provided with a means for decreasing pressure of the aqueous suspension delivered into it from the previous section. Owing to this fact, the temperature at the last step of the steaming process also decreases and is maintained in the range from 90° to 110°C. Vapors that are formed in the lower section (as the pressure decreases) are withdrawn from it through a connection located in the upper part of the section. The suspension is withdrawn from the lower section, the polymer granules are separated from water, and finally dried.

5 Claims, 3 Drawing Figures

METHOD OF AND DEVICE FOR ISOLATION OF RUBBER-LIKE POLYMERS FROM HYDROCARBON SOLUTIONS

This invention relates to a method of isolating rubber-like polymers from hydrocarbon solutions and a device to realize the same.

A method is known for isolation of rubber-like polymers from hydrocarbon solutions comprising at least three steps of steaming used for maximum possible removal of the solvent from the polymer which are accomplished in a number of separate apparatus. According to this method, hydrocarbon solution is delivered to the first step of steaming where it is acted upon by steam. The main bulk of the solvent is evaporated and the polymer is isolated in the form of granules. The solvent vapor and steam are passed to the condensation step, while the granulated polymer is mixed with water to form a suspension which is continually delivered to the next steaming steps, where it is also processed by steam, mixed and the solvent vapours are removed. After discharge of the polymer granules from the last steaming step, the polymer is separated from water and dried.

Also known is a device for carrying out multi-step mass-exchange processes in the presence of liquid and gaseous phases which can be used to isolate rubber-like polymers from hydrocarbon solutions. This device contains a vertical column divided along the vertical line into separate sections. The sections are intercommunicated through means, along which the aqueous suspension of the polymer passes from one section to another, said means being made in the form of transfer pipes located inside the column.

Each section is provided with a stirrer, which are fixed on a common shaft.

Steam is delivered into a lower section of the device through a connection and passed through-out the sections via rotary caps mounted on a common shaft.

The upper section of the column is provided with connections through which the hydrocarbon solution and water are delivered into the apparatus, and through which the solvent vapor and steam are withdrawn from the column.

The lower section has one connection through which the suspension is withdrawn.

The disadvantage of the known method for isolating rubberlike polymers from hydrocarbon solutions is the necessity to carry out the steaming process at temperatures close to or only insignificantly lower than 100°C. The necessity of delivering the suspension from the last steaming step onto vibrating sieves or concentrators, where granules of the polymers are separated from water, interferes with increasing the process temperature, since otherwise large volumes of steam are liberated from the hot suspension which reduces the economical indices of the process and considerably the working conditions.

At the same time, distillation of the solvent from the granulated polymer (a molar-diffusion process) is considerably accelerated at elevated temperatures.

The investigations have shown that, for example, distillation of the solvent toluene from the mixture of granulated polymer and the solvent at a temperature of 140°C takes half as much time compared with the duration of the process at a temperature of 100°C.

Carrying out the process of isolation of rubber-like polymers from hydrocarbon solvents in the known device at elevated temperatures (over 100°C) involves additional consumption of steam which decreases the economic efficiency of the device.

The object of the invention is to intensify the steaming process during isolation of rubber-like polymers from hydrocarbon solvents.

Another object of the invention is to improve the efficiency of the process.

In accordance with these and other objects, the invention consists in that in the method for isolation of rubber-like polymers from hydrocarbon solutions, comprising at least three steaming steps, at which the hydrocarbon solution is delivered to the first steaming step where it is processed with steam, during which the main bulk of the solvent is evaporated and the polymer is isolated in the form of granules, the water and the solvent vapors are delivered to the condensation step, while the granulated polymer is mixed with water to form a suspension which is continually fed to the next steaming steps where it is processed with steam, mixed; the vapors of water and the solvent are separated, after which the granulated polymer is separated from water and dried, according to the invention, the temperature at the first steaming step is maintained within the range from 80° to 180°C, and at the intermediate steps from 115° to 180°C, and at the last step from 90° to 110°C. It is recommended that the steaming temperature at the first steaming step be maintained at 80°–105°C. In the device for the realization of the proposed method, comprising a vertical column divided along the vertical line into separate sections and intercommunicated through means for the passage of the polymer suspension from one section to another, mechanical means for stirring the suspension installed in each section, means for delivering steam into the sections, a connection for delivery of the hydrocarbon solution of the polymer, a connection for withdrawal of the aqueous suspension of the granulated polymer and removal of the solvent and water vapours, according to the invention the lower section is provided with a means to decrease the pressure of the suspension delivered from the previous section, and a connection located in the upper part through which the vapors formed during the pressure decrease, are withdrawn from the apparatus.

It is recommended also that the means for delivery of steam into the sections should include an injector which would communicate the connection for withdrawing the vapors from the lower section with the previous sections.

The advantages of the present invention, as compared with the known methods, are significant intensification of the distillation process of the solvent distillation from the granulated polymer and decreased consumption of steam.

Figure 2:
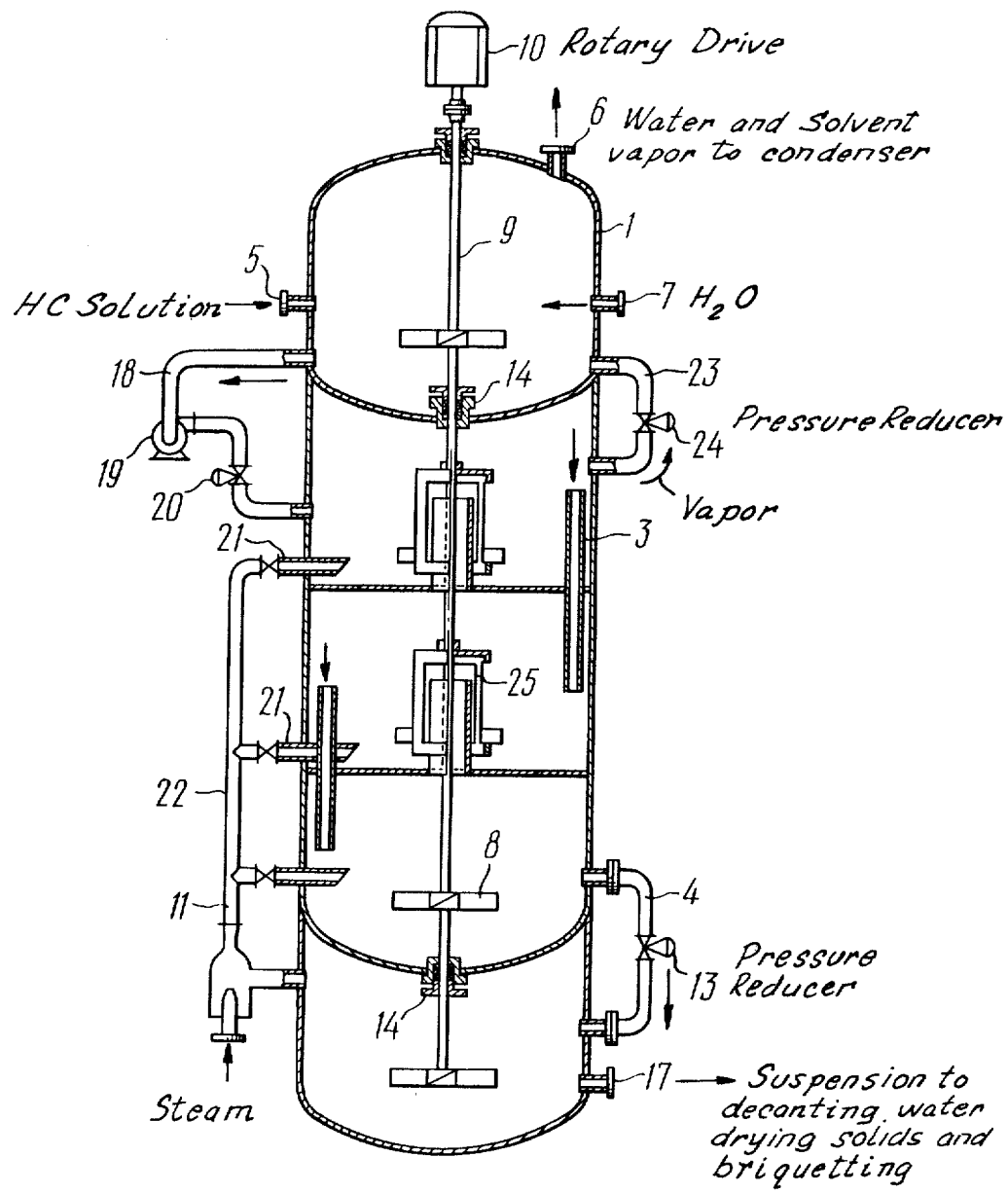
Figure 3:
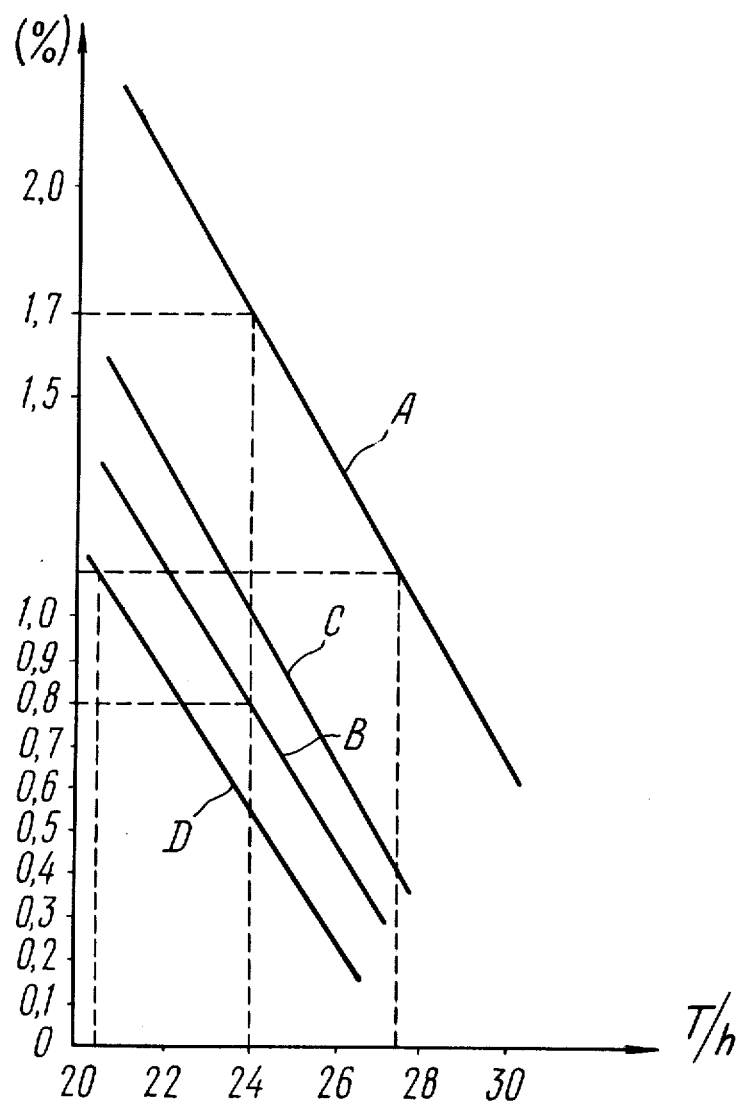

The other objects and advantages of the present invention will become apparent from the description of the examples of its practical embodiment, and the appended drawings, in which:

FIG. 1 shows the general view of the device for isolation of rubber-like polymers from hydrocarbon solutions according to the invention (vertical section);

FIG. 2 is another embodiment of the device for isolation of rubber-like polymers from hydrocarbon solutions according to the invention (vertical section) in which caps 25 are shown in elevation on the left side of shaft 9 and in vertical section on the right side of shaft 9; and FIG. 3 is a graph illustrating the dependence of the residual content of the solvent in granulated polymer upon the consumption of steam under various temperature conditions of the process for isolating cis-1,4-polybutadiene from a 10-per cent solution in toluene.

The device for isolating rubber-like polymers from hydrocarbon solutions contains a vertical column 1 (FIG. 1) divided vertically by horizontal partitions 2 into five separate sections. The above sections are interconnected through means, along which the polymer suspension in water passes from one section to another, the said means being made in the form of transfer pipes 3 located inside the column 1.

The last and the next-to-the last sections are intercommunicated through pipe 4 located outside the column 1.

The upper section has a connection 5 through which the hydrocarbon solution of the polymer is passed into the column 1, and also a connection 6 through which water and solvent vapors are removed, and a connection 7 to admit the circulating water.

Each section is provided with a stirring device to mix the suspension, the device being made in the form of stirrers 8 mounted on a common central shaft 9 set in rotation from a drive 10.

The means for delivery of steam into the sections is in the form of an injector 11 serving to deliver steam into the next-to-the last section, and caps 12, installed in all sections except the last and next-to-the last sections. Caps 12 are rigidly fixed on the central shaft 9, and the paddles of the stirrers 8 are fastened to the outside walls of the caps. Owing to this design of the means for delivery of steam, the counter-current principle of motion of the steam and the suspension is realized.

The lowest section of the column 1 is provided with a means to reduce the pressure of the polymer suspension in water which is delivered from the previous section. This means is made in the form of a control valve 13 installed in the pipe 4.

In order to isolate the last section from the next-to-the last one (the pressure of suspensions in which differs significantly) a seal 14 is provided on the central shaft 9.

In the upper part of the lowest section there is a connection 15 through which the vapors, forming during decreasing pressure of the suspension are withdrawn. The connection 15 is communicated with a pipe 16 and the injector 11. However, the connection 15 can be communicated also with any other device utilizing the vapors that are formed in the last section. In this case the injector 11 is dispensed with.

In order to discharge the suspension from the last section a connection 17 is provided.

Another embodiment of the device for isolation of rubberlike polymers from hydrocarbon solutions comprises a vertical column 1 (FIG. 2) divided vertically by horizontal partitions 2 into five separate sections.

The first section (counting from top to bottom) of the column 1 is communicated with the second section through a pipe 18 that passes outside the column 1 and serves for the suspension to pass from the first section into the second one.

A pump 19 installed on the pipe 18 serves to transfer the polymer-in-water suspension from the first section into the second one.

A valve 20 installed on the pipe 18 serves to control the suspension level in the upper section.

In order to admit the suspension from the second section into the third one, and from the third into the fourth section, pipes 3 are used which are located inside the column 1, and pipe 4 with the valve 13, located outside the column 1, serve to pass the suspension from the fourth into the fifth section.

The upper section has connections 5, 6 and 7, and the lower section has connections 15 and 17, which are similar in design to those of the device shown in FIg. 1.

Each section is provided with a stirrer 8, which is also similar to the stirrer installed in the device of FIG. 1.

The delivery of steam into the sections is parallel. This is obtained owing to the fact that the second, the third and the fourth sections are provided with connections 21 located in their lower parts and communicated with the pipe-line 22 through which steam is delivered. Injector 11 is installed on the pipe-line 22. Vapors are delivered from the second section into the first section through pipe 23 provided with a control valve 24. The pipe 23 communicates the upper part of the second section with the lower part of the first section.

A valve 24 serves to control pressure in the intermediate sections.

In the second and the third sections, installed on the central shaft are caps 25 having openings through which vapors pass upwards through the sections without coming in contact with the liquid in the sections installed above.

A seal 14 on the central shaft 9 serves to isolate the first and the second, and also the fourth and the fifth sections, in which the pressure of the suspension differs greatly.

The method for isolation of rubber-like polymers from hydrocarbon solutions is carried out as follows.

The hydrocarbon solution of rubber-like polymers is delivered through the connection 5 into the upper section of the column 1 (FIG. 1). Circulating water is delivered into the same section through the connection 7.

Steam is delivered into the next-to-the last section through the injector 11. Steam passes through the sections of the column (up to the upper section) through the rotating caps 12 and comes in contact with the liquid phase in each section.

The hydrocarbon solution of the polymer is treated by steam which is passed into the upper section through the cap 12.

The main bulk of the solvent is evaporated together with the steam in the medium of hot water to effect isolation of the polymer in the form of granules.

The solvent vapor, together with the steam, is withdrawn through the connection 6 and delivered to the condensation step. The granulated polymer is mixed with water by the stirrer 8 to form an aqueous suspension. The thus-obtained aqueous suspension of the polymer is passed through the pipe 3 into the second section of the device, where it is processed also with steam and mixed by the stirrer 8.

In a similar way the suspension passes through the other sections of the device, each of which is a steaming step, while from the last section the suspension is discharged through the connection 17 for further processing (separation of the polymer from water, drying, briquetting).

In the method according to the invention, the process temperature at the first steaming step is maintained within the limits of from 80° to 180°C, and at the intermediate steps within the range of from 115° to 180°C, which significantly intensifies the process of isolation of the polymer from the hydrocarbon solution.

At the last step, the pressure of the suspension delivered into the apparatus, is decreased by means of the control valve 13, which decreases the temperature in this section to 90°–110°C.

Vapors that are liberated in the given section are passed through the connection 15, the pipe 16, and the injector 11 into the previous section for repeated use in the process of stripping the solvent, which increases the efficiency of the process.

With respect to the economy of the consumption of steam in the process of isolation of rubber-like polymers from solutions, it is not always advantageous to a maintain high temperature (80°–180°C) at the first steaming step. The content of steam in the vapor mixture consisting of the solvent vapor and steam (which are delivered to the condensation step) increases. This, in turn, increases the load on the condensation system and requires great heat consumption. In order to avoid this, it is recommendable to maintain the process temperature at the first steaming step within the range from 80° to 105°C.

In this case, use can be made of the device shown in FIG. 2. In this device, in order to maintain the process temperature in the first section substantially lower than in the other (intermediate) sections, the pressure of vapors delivered from the second section is decreased, in the first instance by means of the control valve 24. The necessity arises here to pump the suspension from the first section into the second one. This is accomplished by the pump 19. The suspension level in the first section is controlled by the valve 20.

The method for isolation of rubber-like polymers from hydrocarbon solutions realized in the device according to this version of the invention is characterized in that steam is delivered into the intermediate sections in parallel currents along the pipe 22 and the connection 21. As the vapors pass upwards in the sections through the caps 25 they practically do not contact the liquid in the sections located above. Further, all vapors are delivered into the first section through the pipe 23 and valve 24.

For a better understanding of the invention, the following examples of its practical embodiment are given by way of illustration.

EXAMPLE 1

Isolation of cis-1,4 polybutadiene from its 10 per cent solution in toluene. The polybutadiene was prepared by the polymerization process in a solution of toluene with the use of a catalyst consisting of tri-isobuytl aluminum and iodine-titanium dichloride. The concentration of cis-1,4 units in the product was 92.5 per cent, and the Muni viscosity at 100°C was 45.

The steaming processes comprised five steps. The temperature at each steaming step was as follows:

the first step 92°C, the second step 135°C, the third step 137°C, the fourth step 139°C, and the fifth step 102°C.

The steam was delivered in a counter-current flow.

The result of the process were 3900 kg/hour of cis-1,4 polybutadiene.

EXAMPLE 2

The materials used in the experiment were the same as in Example 1.

The steaming process was accomplished in five steps at the following temperatures:

the first step 80°C, the second, the third and the fourth steps 115°C, and the fifth step 90°C.

Steam was delivered into the sections in parallel flows.

EXAMPLE 3

The polymer was isolated in the same system as in Example 2, at the following temperatures:

the first step 168°C, the second, the third and the fourth steps 180°C, and at the fifth step 110°C.

The curve illustrating the dependence of the residual content of the solvent in the polymer on the consumption of steam at various temperatures of the process for isolation of cis-1,4 polybutadiene from a 10 per cent solution in toluene is given in FIG. 3.

Line A in the graph describes the above dependence in the isolation of the polymer by the known method at the following temperatures:

the first step 92°C, the second 101°C, the third 103°C, the fourth 105°C, and the fifth step 107°C.

Line B describes this dependence in conditions of Example 1, line C in conditions of Example 2, and line D in conditions of Example 3.

The graph shown in FIG. 3 indicates that at the steam consumption of 24 tons/hour the residual content of the solvent in the rubber after the last step of steaming in the known method is 1.7 per cent, while in Example 1 it is only 0.8 per cent, in Example 2 (for lower temperatures in each step than in the corresponding step in Example 1), 1.0 per cent. In order to ensure the residual content of the solvent of 1.1 per cent by the known method, it is necessary to consume steam at a rate of 27.5 tons per hour while in Example 3 the consumption rate is only 20.5 tons/hour.

Moreover, the proposed method ensures a higher degree of steaming of the solvent (less than 0.2 per cent by weight) compared with the known method.

We claim:

1. A method for isolating a rubber-like polymer from a solution thereof in a hydrocarbon solvent comprising adding water and vapor to the polymer solution with agitation at a temperature of 80°–180°C. to form an aqueous suspension of polymer granules and to evaporate the bulk of the solvent in a first steaming step; continuously delivering the suspension from the first steaming step to at least one intermediate steaming step wherein the suspension is agitated and treated with vapor at a temperature of 115°–180°C and then to a final flashing step wherein the vapor treated suspension from the intermediate step is agitated at a temperature of 90°–110°C. to remove final traces of solvent; discharging the polymer suspension from the final flashing step; separating the polymer from water; and drying the polymer; and wherein the solvent vapors and steam are continuously withdrawn in each step counterflow to the flow of the polymer suspension.

2. A method according to claim 1, in which the temperature of the first steaming step is maintained within the range from 80° to 105°C.

3. A method according to claim 1 wherein the temperature in the first steaming step and the final flashing step is lower than in the intermediate steps.

4. A multistage evaporator, comprising a vertical column, divided vertically by horizontal partitions into separate sections; means to pass polymer suspension from the uppermost section via successive intermediate sections to the lowermost section; rotating mechanical means to stir the said aqueous suspension in each said section; means to deliver live steam plus regenerated vapor from the lower most section into the next-to-lowermost section; means to pass vapor from the next-to-lowermost section via successive intermediate sections to the uppermost section; means to decrease the pressure of the said suspension delivered into the lowermost section from the previous section; a vacuum connection located in the upper part of the said lowermost section serving to withdraw the vapors formed during decreasing pressure of the said suspension; at least one connection to deliver hydrocarbon solution into the uppermost section; at least one connection to permit withdrawal of the said suspension located in the said lowermost section; at least one connection to remove the vapors of the solvent and water from the uppermost section in said column; and at least one connection to deliver water into the uppermost section to form a suspension of granular polymer in water.

5. A multistage evaporator, comprising a vertical column divided vertically by horizontal partitions into separate sections; means to pass polymer suspension from the uppermost section via successive intermediate sections to the lowermost section; rotating mechanical means to stir the said aqueous suspension in each section; means to deliver steam plus regenerated vapor to the intermediate sections which comprises a steam injector whose induction inlet is connected to the vapor outlet of the lowermost section and whose exhaust outlet is connected to the liquid spaces of the intermediate sections; means to pass vapor from the next-to-lowermost section via successive intermediate sections to the uppermost section; means to decrease the pressure of the said suspension delivered into the lowermost section from the previous section; a vacuum connection located in the upper part of the lowermost section serving to withdraw the vapors formed during decreasing pressure of the said suspension; at least one connection to deliver hydrocarbon solution into the uppermost section; at least one connection to permit withdrawal of the said suspension located in the said lowermost section; at least one connection to remove the vapors of the solvent and water from the uppermost section in said column; and at least one connection to deliver water into the uppermost section.

* * * * *